G. C. MILLER.
AUTOMOBILE SCREEN.
APPLICATION FILED APR. 16, 1919.
1,354,987.
Patented Oct. 5, 1920.
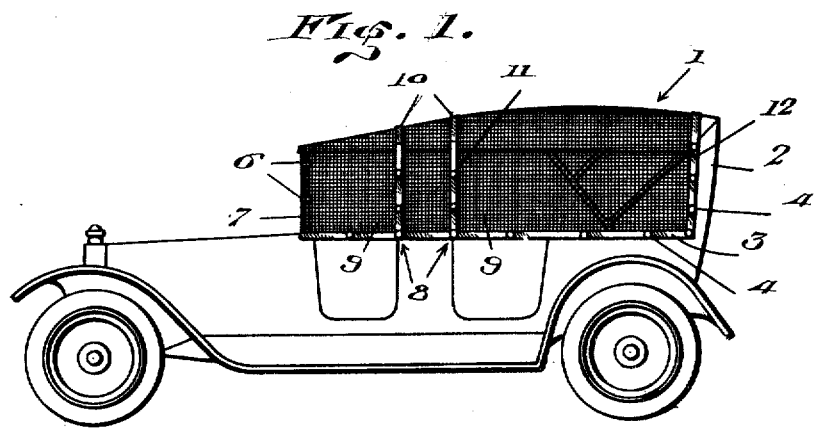
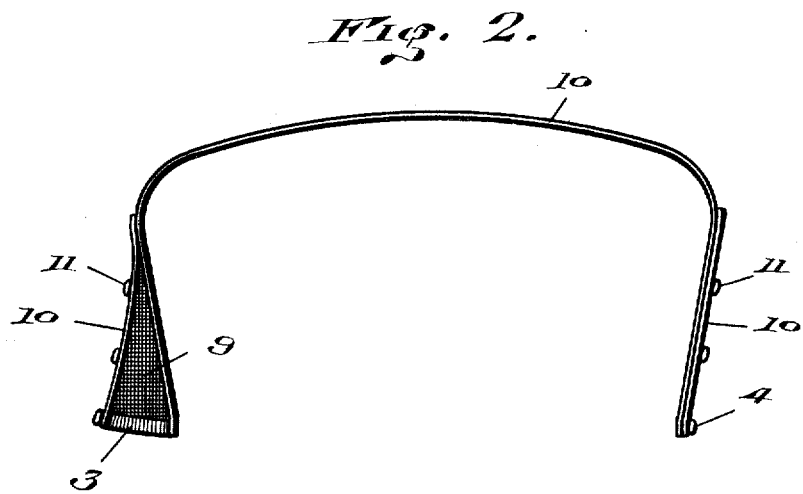
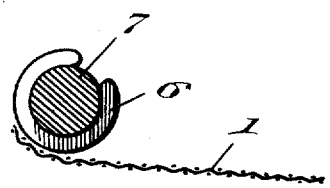
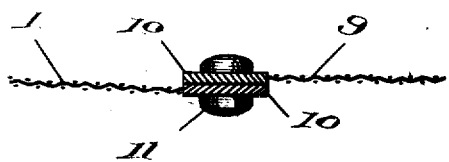
WITNESS:
INVENTOR.
Georgiana C. Miller
BY
ATTORNEYS.

UNITED STATES PATENT OFFICE.

GEORGIANA COLE MILLER, OF LIVINGSTON, MONTANA.

AUTOMOBILE-SCREEN.

1,354,987.   Specification of Letters Patent.   Patented Oct. 5, 1920.

Application filed April 16, 1919. Serial No. 290,457.

*To all whom it may concern:*

Be it known that I, GEORGIANA COLE MILLER, a citizen of the United States, residing at Livingston, in the county of Park and State of Montana, have invented certain new and useful Improvements in Automobile-Screens; and I do hereby declare the following to be a full, clear, and exact description of the invention, such as will enable others skilled in the art to which it appertains to make and use the same.

The present invention relates to a screen for use on automobiles, and the object of the invention is the provision of a novel and improved form of screen to be used over the top of a motor vehicle for keeping out insects.

A further object is the provision of such a screen having novel means for fastening it in place to the body, top and wind shield of the vehicle.

A still further object is the provision in such a screen, of means permitting the occupants of the vehicle to enter and leave.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of an automobile with the screen applied.

Fig. 2 is a cross section on the line 2—2 of Fig. 1 showing one flap open.

Fig. 3 is an enlarged sectional detail showing the clasps for attaching the same to the wind shield.

Fig. 4 is an enlarged sectional detail showing the flaps of the screen for the doors of the body, as to permit of persons entering and leaving the vehicle.

The screen is composed of a canopy 1 of netting or open woven fabric, provided with a top and sides so that it can fit snugly over the top 2 of an automobile, as seen in Fig. 1. This screen or netting 1 is provided at the sides along the lower edges, with strips 3 of cloth, leather, or other suitable material, to fit the upper edge of the vehicle body, and the strips 3 are provided with eyes or fasteners 4 to engage the studs or other equivalents that are already on the vehicle body for the attachment of the side curtains of the top. Thus, the strips 3 can be applied to said studs to fasten the sides of the screen to the body.

The screen 1 is provided at the forward ends of its side with clasps 6 to snap over and embrace the posts 7 of the wind shield, and these are especially desirable when the screen does not extend across the wind shield.

The sides of the screen 1 are slit upwardly, as at 8, at the points where the doors of the vehicle body open, thereby dividing the sides of the screen into the flaps 9 so that they can be lifted up when the doors are opened, to permit persons to enter or leave the vehicle. The slips 8 extend through the strips 3, and similar strips 10 are secured to the vertical edges of the flaps 9. The strips 10 overlap when the flaps 9 are in place, and are secured detachably together by means of suitable fasteners 11 similar to those used on gloves, or the like. The fasteners 11 can be of any suitable kind to permit of attachment and detachment of the strips 10. Some of the strips 10 extend from one side to the other over the top so as to form part of the opposite door flaps, and to assist in supporting the screen.

A strip 12 attached to the rear edges of the sides and ends of the screen extends over the top and has eyes or fasteners 4 to engage the back of the top.

With the provision of the present screen, the occupants of the vehicle will be protected against mosquitoes and other insects, adding to the comfort and enjoyment of the motor vehicle.

Having thus described the invention, what is claimed as new is:—

An automobile screen having a top and opposite sides to fit over the top of an automobile, said sides having means along their lower edges for attachment to the sides of the automobile body, said sides being slit upwardly from their lower edges to provide flaps above the doors of the automobile body, strips secured transversely to the top and sides of the screen and extending from one side to the other so as to extend across and rest upon the top of the automobile for supporting the screen, some of said strips extending along the edges of said slits at one edge of each slit, and other strips secured to the sides of the screen along the other edges of the slits, the first and second named strips having interengageable means for holding the flaps closed.

In testimony whereof I have signed my name to this specification in the presence of two subscribing witnesses.

GEORGIANA COLE MILLER.

Witnesses:
ANNA M. ALTON,
ELIZABETH C. LINCOLN.